United States Patent [19]

Whitehead

[11] Patent Number: 4,741,431
[45] Date of Patent: May 3, 1988

[54] CONVEYOR FOR BULK GOODS

[76] Inventor: Jerald M. Whitehead, 5136 W. Cherry La., Meridian, Id. 83642

[21] Appl. No.: 894,493

[22] Filed: Aug. 4, 1986

Related U.S. Application Data

[63] Continuation of Ser. No. 234,351, Feb. 13, 1981, abandoned.

[51] Int. Cl.$^4$ .............................................. B65G 17/00
[52] U.S. Cl. ..................... 198/844; 198/494; 198/841; 198/715; 414/327
[58] Field of Search ............... 198/494, 495, 497, 498, 198/728, 822, 841, 844, 715; 414/528, 536, 327

[56] References Cited

U.S. PATENT DOCUMENTS

| | | | |
|---|---|---|---|
| 159,907 | 2/1875 | Crossley et al. | 414/528 X |
| 568,583 | 9/1896 | Richards | 198/844 X |
| 749,695 | 1/1904 | Litchfield et al. | 198/850 X |
| 861,484 | 7/1907 | Stewart | 198/844 |
| 1,024,073 | 4/1912 | Hannam et al. | 198/865 X |
| 1,078,068 | 11/1913 | Sigismund | 198/844 X |
| 1,081,697 | 12/1913 | Renney et al. | 414/528 |
| 1,322,031 | 11/1919 | Litchfield et al. | 198/844 X |
| 1,322,032 | 11/1919 | Lussier | |
| 1,354,553 | 10/1920 | Harter | 198/834 X |
| 1,388,407 | 8/1921 | Conklin | |
| 1,438,566 | 12/1922 | Wiggins | 198/844 X |
| 1,489,290 | 4/1924 | Walther | 198/498 |
| 1,535,039 | 4/1925 | Rettler | 414/327 |
| 1,558,164 | 10/1925 | Haney | 414/528 X |
| 1,809,796 | 6/1931 | Beardsley et al. | 414/528 X |
| 1,880,155 | 9/1932 | Ruth | 414/528 X |
| 1,928,859 | 10/1933 | Kutscha | 414/528 X |
| 2,496,305 | 2/1950 | Ortmeier | 414/514 |
| 2,496,463 | 2/1950 | Gaddis | 198/616 X |
| 2,668,629 | 2/1954 | Dahlman | 414/528 X |
| 2,717,703 | 9/1955 | Kull et al. | |
| 2,784,854 | 3/1957 | Roberts | 414/528 |
| 2,890,803 | 6/1959 | Vanier et al. | 414/327 X |
| 3,265,188 | 8/1966 | Redden | 198/706 |
| 3,297,144 | 1/1967 | Michaelson et al. | 198/822 X |
| 3,356,207 | 12/1967 | Hensel | 198/848 X |
| 3,419,131 | 12/1968 | Patz | 198/498 |
| 3,447,668 | 6/1969 | Jernigan | 198/851 X |
| 3,788,461 | 1/1974 | Friesen | 198/494 X |
| 3,819,072 | 6/1974 | Reed | 198/494 |
| 3,876,089 | 4/1975 | Moser | 198/844 |
| 3,901,377 | 8/1975 | Euverard et al. | 198/606 |
| 4,055,265 | 10/1977 | Eisenman | 198/844 |
| 4,078,654 | 3/1978 | Sarovich | 198/844 |
| 4,253,791 | 3/1981 | Van Drie | 198/728 |
| 4,664,583 | 5/1987 | Gust | 414/528 |

FOREIGN PATENT DOCUMENTS 1226961  3/1971  United Kingdom .

Primary Examiner—Joseph E. Valenza
Assistant Examiner—Jonathan D. Holmes
Attorney, Agent, or Firm—Christensen, O'Connor, Johnson & Kindness

[57] ABSTRACT

A conveyor for bulk goods of the endless-chain type including a bin having a longitudinal floor and upwardly extending and divergent sidewalls; at least two laterally spaced, sprocket mounted and driven, endless chains defining a working flight above the floor and a return flight below the floor; and a plurality of flexible load supporting flaps, each of the flaps having a leading edge attached to the laterally spaced chains by separate brackets to permit flexing of the flap in case of obstruction and a free trailing edge operable to overlap the leading edge of an adjacent and rearwardly spaced flap. Each of the flaps may also include a flexible scraper adjacent its leading edge operable to engage the upper surface of the floor for cleaning the floor.

1 Claim, 3 Drawing Sheets

CONVEYOR FOR BULK GOODS

This application is a continuation application based on prior copending application Ser. No. 234,351, filed Feb. 13, 1981, now abandoned.

BACKGROUND OF THE INVENTION

1. Field of the Invention

This invention relates in general to conveyors and in particular to endless chain-type conveyors for the movement of bulk goods.

2. Description of the Prior Art

It is highly desirable in the conveying of bulk goods and bulk crops, in particular, that the conveyor have positive traction; that the load bearing surface of the conveyor be flexible to minimize damage to the crops; and that the conveyor drive system remain free from obstruction. U.S. Pat. No. 2,717,703 issued to W. Kull discloses a feeder conveyor which may be of the rope, belt, or chain type and which utilizes drums, sprockets, or wheels for guiding and driving the endless belt. Kull further suggests use of flexible material such as textile fabric for use in the construction of articulating flap members. Kull does not suggest the manner in which the flaps might be combined with the chains when the positive traction of the chains is preferred.

U.S. Pat. No. 2,496,463 issued to R. C. Gaddis discloses a conveyor using chains and sprockets for positive traction and further discloses a series of transverse bars welded or other wise secured to laterally spaced chains for moving material along a lower spaced longitudinal floor.

U.S. Pat. No. 4,055,265 issued to L. J. Eisenman discloses a series of transverse bars secured between laterally spaced chains and a series of overlapping flexible flaps attached to the bars for supporting material placed thereon. In the Eisenman invention the overlying load causes the flaps to pull directly against the transverse bars to which they are attached resulting in the flap tearing away from the attaching rivets.

Current problems in the art, to which the present invention is addressed and which are not solved by the prior art include the "down-time" caused by damage to the rigid cross bars, and to the chains to which the rigid cross bars are fixed by obstructive materials such as rocks and stones which are inadvertently included with the bulk materials; the "down time" caused by the tearing of flaps; the prevention of "build-up" material on the conveyor floor; the low dispensing rate of fine grains because of the rolling action of overlying grains relative to the conveyor belt; and the down-time due to lost flaps.

SUMMARY OF THE INVENTION

The present invention comprises, generally, a conveyor having a longitudinally extending floor and divergently upstanding walls supported on suitable framework; two or more sprocket driven chains defining an upper flight and a lower return flight relative to the floor and a plurality of flexible flap members separately fixed to each chain, each of said flap members including a flexible scraper adapted to ride upon and engage the top surface of the floor, under load, for scraping the floor of debris. A more precise definition of the invention may be found in the appended claims.

It is therefore an object of the present invention to provide an endless chain-type conveyor having flexible flaps provided with flexible scrapers for cleaning the floor surface of the conveyor.

More specifically it is an object of the present invention to provie scrapers which are fastened to flexible flaps forward of the flaps attachment to conveyor chains so that the flaps are pushed forwardly.

It is also an object of the present invention to provide a conveyor in which endless chains are independently connected to flexible load-bearing flaps to prevent conveyor damage due to obstructive material.

It is a further object of the present invention to provide a conveyor having flexible load-bearing flaps providing pockets for movement of fine particles.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
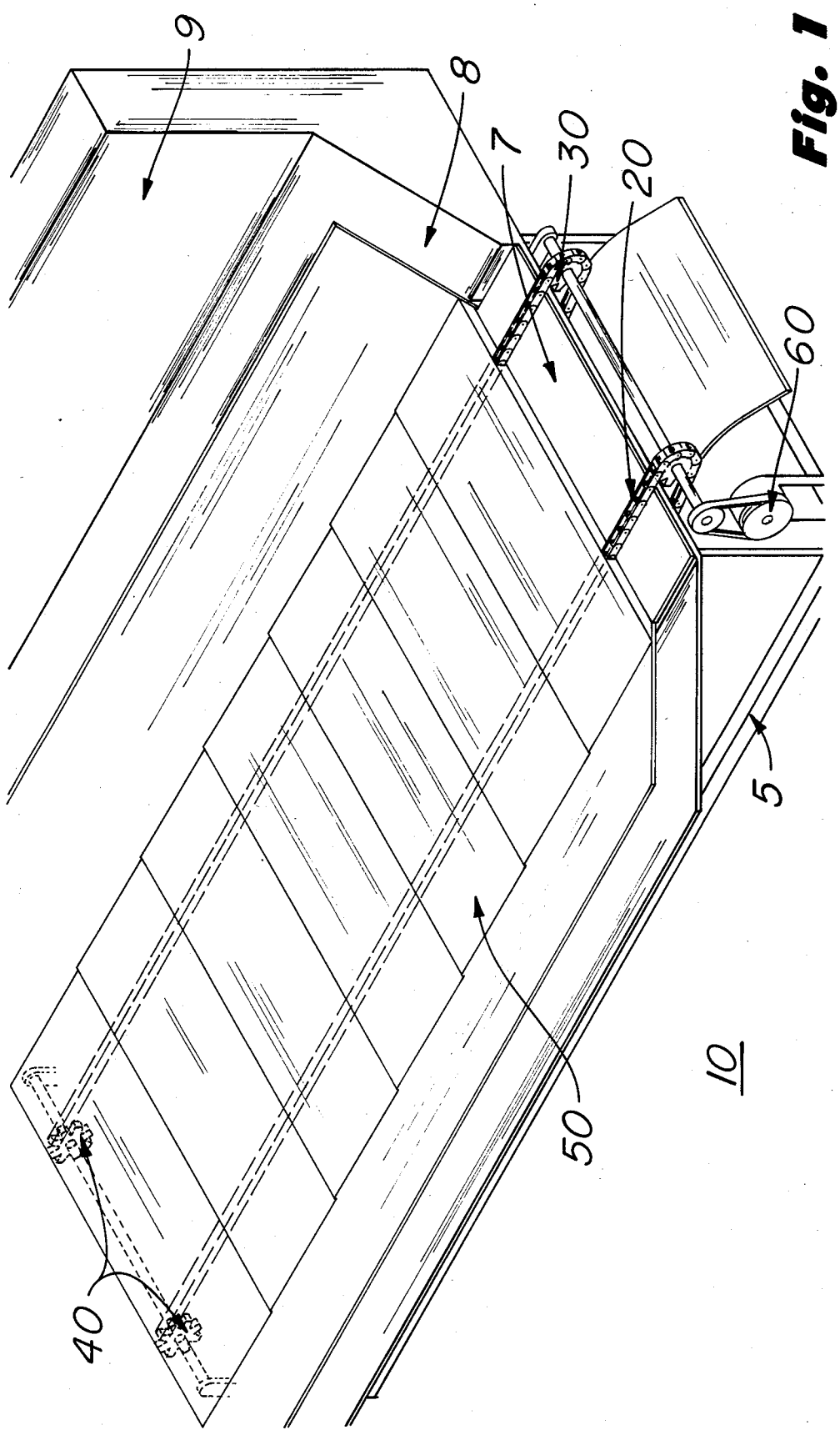
FIG. 1 is a perspective view of a conveyor made according to the present invention.
Figure 2:
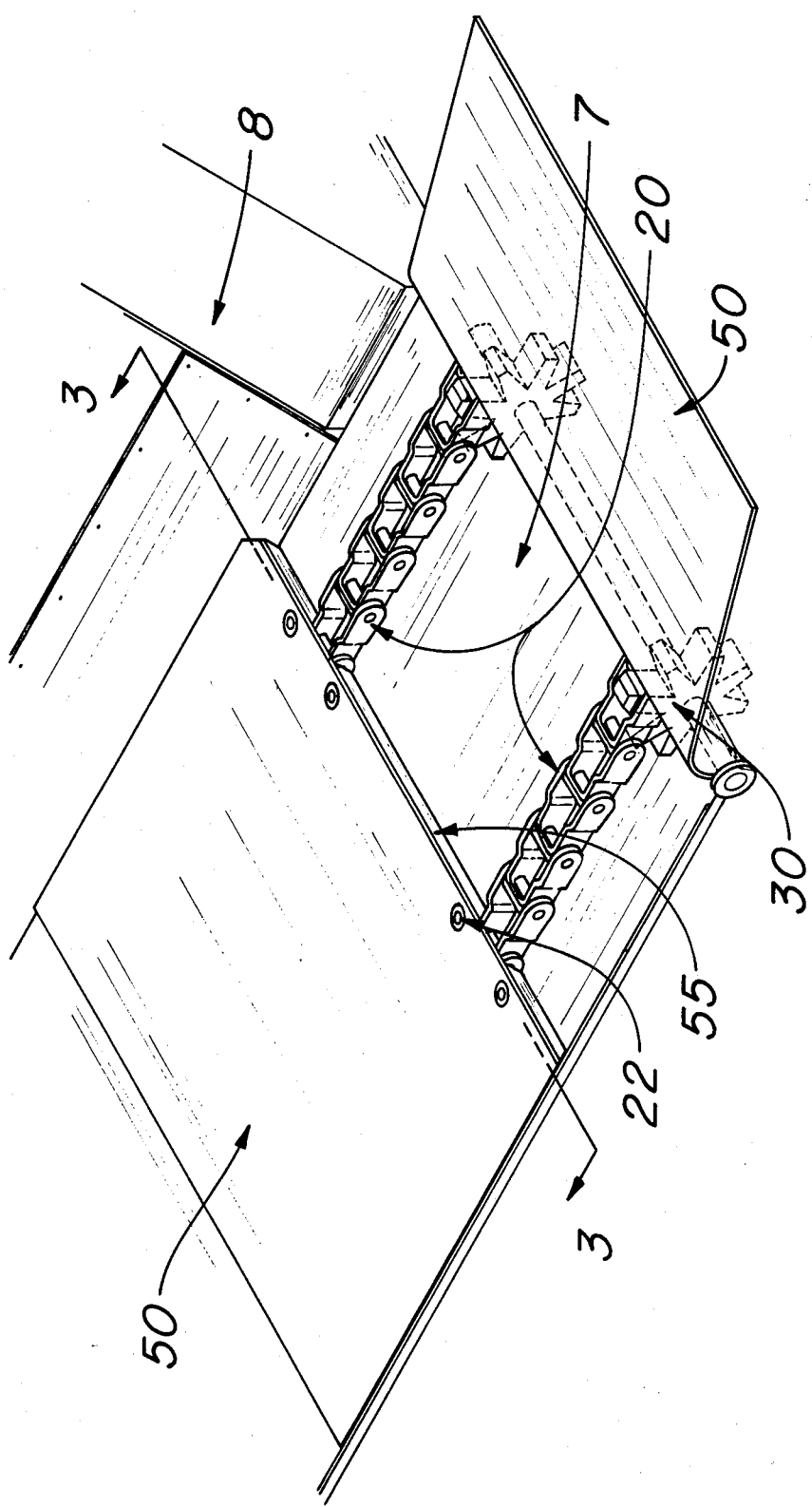
FIG. 2 is a close-up perspective view showing details of construction.
Figure 5:
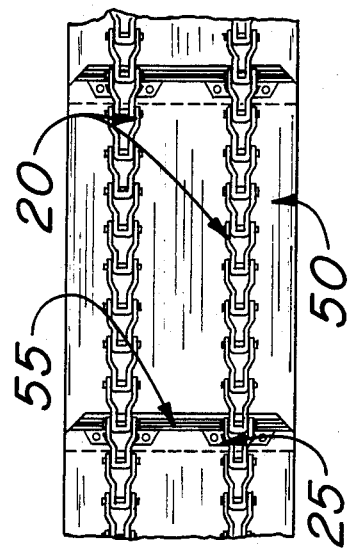
FIG. 5 is a fragmentary view of the under surface of the flexible flaps and chains of the invention.
Figure 6:
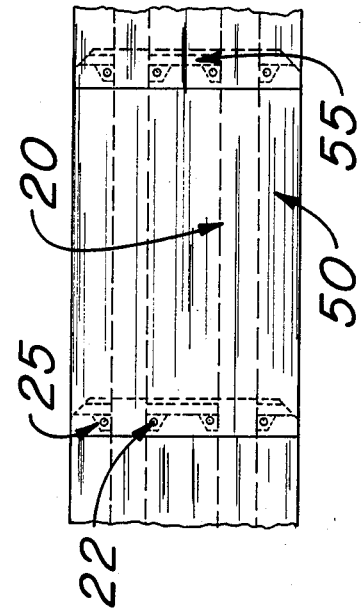
FIG. 6 is a fragmentary plan view of the flaps showing underlying attachment bars and flexible scrapers in outline.

Referring now to the drawings and to FIGS. 1 and 2, in particular, one embodiment of the conveyor of the present invention is shown to advantage. Conveyor 10 includes framework 5 supporting a floor 7 and side walls 8; a pair of endless chains 20 driven by sprocket wheels 30; a second set of sprocket wheels 40 serving as idlers; flexible load-bearing flaps 50; and drive means 60.

Framework 5 may be any suitable framework for supporting the conveyor and may be either fixed or portable. A vehicle chassis may readily serve as the framework.

A longitudinal, horizontally extending, floor 7 having a substantially planar upper surface is mounted on the framework. A pair of side walls 8 join the floor adjacent its lateral edges. Walls 8 preferably extend upward and divergently outward for funneling overlying material to the conveyor. Additional structural provisions such as a storage bin, end walls, end gates, and the like may of course be added but are not a part of the present invention.

Figure 4:
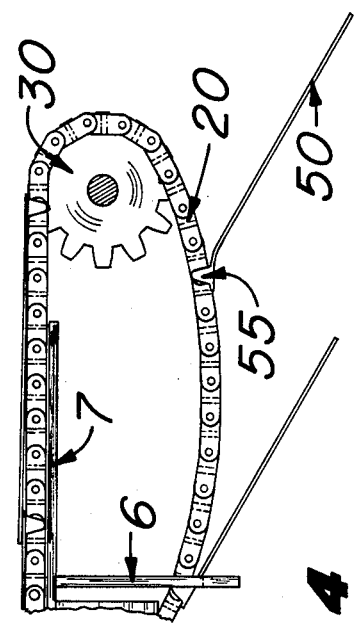
FIG. 4 is a fragmentary side view showing chain engagement with a sprocket wheel.

Endless chains are provided to give positive traction to the conveyor, as opposed to endless belts which are prone to slip. While any number of such chains may be provided, depending upon the width of the conveyor, a pair of laterally spaced chains 20, as shown in the figures, will generally be preferred. The upper flight of each chain rests upon and moves along the upper surface of floor 7 and the lower flight is carried along below the floor and may be supported by longitudinally spaced U-shaped support trusses 6 as shown in FIG. 4. Such trusses are particularly useful for chains of long length to prevent excessive weight on the supporting sprocket wheels. Trusses 6 are also useful for dislodging conveyed material which might otherwise stick to the flaps carried by the chains. Each chain is engaged at one end of the floor by a drive sprocket wheel 30 which may be carried upon a common shaft and is engaged at the other end of the floor by idler means 40 in the form of a sprocket wheel. While the idler means is preferably in the form of a sprocket wheel, it will be understood that rollers, friction guides, and the like may also serve as idlers. Each structure is old in the art and a lengthy description is believed unnecessary. A motor 60, engine, or like power source, drive sprockets 30 for moving conveyor chains 20.

Figure 3:
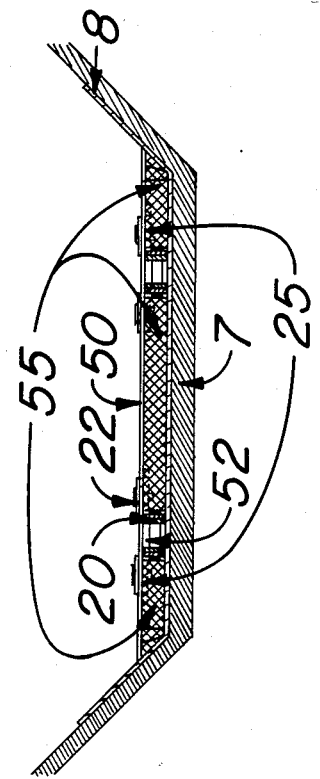
FIG. 3 is a sectional view taken along line 3—3 of FIG. 2.

Of prime importance in the present invention is the flexible load bearing flaps and their attachment to the chains. Flaps 50 may be constructed of any suitable fabric, plastic, or rubber, or any combination thereof. Preferably the flaps are made of rubber-fiber composition which permits the flap to generally conform to the shape of the load and the flap supports underlying structures. The flaps are substantially rectangular in form defining a leading edge and a trailing edge. The leading edge may be clipped or beveled backwardly at an angle of approximately 45°, as shown to advantage in FIG. 2, to reduce friction between the edges of the flap and sides 8. The leading edge is provided with a downwardly depending flexible scraper 55, having a thickness substantially equal to the endless chains to which each flap is attached. Scraper 55 extends the substantial width of the leading edge, having appropriate notches 52 for the chain, as is shown to advantage in FIGS. 2 and 3. The scraper may be constructed of any suitable flexible material. Rubber has been found tto work extremely well. The scraper may be attached to the under surface of each flap by vulcanization or other suitable fastening means. It is to be noted that the scraper is mounted forardly of attachment bar 25 so that the bar pushes against the scraper and therefore pushes the flap to which the scraper is attached.

Each chain is independently attached to each flap adjacent the leading edge of the flap by means of at least one attachment bar 25. In this manner, it is to be noted, only flexible flap 50 and flexible scraper 55 extend between respective laterally spaced bars 25. The resiliency of members 50 and 55 permit individual chains and attached flaps to ride over minor obstructions such as rocks or stones which may work their way under the flap, scraper, or chains.

Attachment bars 25 preferably include two flat laterally projecting members which are welded to each side of a chain link. The bars include vertical apertures adapted to receive either bolts or rivets 22 for attachment of flaps 50. The flaps are attached to the chains in such a manner that the trailing edge of each flap overflaps a leading edge of a rearwardly located adjacent flap to present a continuous belt-like surface.

The operation of the conveyor will now be described using the unloading of fine grain, such as oats, from a truck, for example. It is assumed that the conveyor is suitably attached to the under surface of the truck bin 9, as illustrated in FIG. 1. Motor 60 is activated to drive sprocket wheels 30 for pulling chains 20, in their engagement with floor 7 and idler sprockets 40, to the rear of the conveyor. Flexible flaps 50, under the weight of the grain, conform to the shape of the underlying structure—the floor 7, the chains 20, attachment bars 25, and scraper 55—to form "pockets" in each flap. These moving pockets tend to prevent slippage between grain particles for improved efficiency of emptying of the bin. The weight of the grain also tends to seal the sides of flaps 50 against side walls 8 to prevent accumulation of grain below the flaps. Because of their greater density, rock or stones which have been mixed with the grain during harvesting, tend to work to the bottom of the conveyor and will occasionally work under the flaps together with small amounts of grain. Any such debris is swept rearwardly by scraper 55 of each flap until ejected at the end of the conveyor. It is to be particularly noted that rocks which may become lodged in or under chain links may cause the chain to rise above the plane of the floor upon which it rides. In that each chain is independent relative to a laterally spaced chain, for the reason that the chains are connected laterally only by flexible flaps and scrapers, the conveyor continues to function.

As each flap reaches the end of the conveyor, the trailing edge of the flap slips on the leading edge of the adjacent successive rearward flap thereby accommodating for the increased pitch diameter of the sprockets. The trailing edge of the flap is then flipped outwardly, tending to free the flap of attached grain particles. Any grain which may adhere to the flap is likely to be discharged as the flap engages spaced trusses 6 on its return flight.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:
1. Conveyor apparatus for bulk goods comprising:
 (a) an elongated floor having a substantially planar upper surface and a pair of oppositely disposed longitudinal sidewalls upwardly and divergently extending from respective edges of said floor;
 (b) a framework attached to and supporting the floor;
 (c) at least two laterally spaced drive sprockets rotatably mounted to said framework adjacent one end of the floor;
 (d) idler means mounted to the framework adjacent to the opposing end of the floor;
 (e) at least two endless chains, each of said chains operable to engage respective laterally spaced drive sprockets and said idler means;
 (f) a plurality of flexible conveyor flap members mounted to extend between the laterally spaced chains, each of the flap members having a forward edge and a trailing edge, the trailing edge adapted to overlap the forward edge of the rearwardly and adjacently mounted flap, at least one of said flap members including a downwardly depending flexible scraper mounted parallel to and adjacent to the forward edge of said flap member to which it is attached and configured to conform to the floor and sidewalls of the conveyor; and
 (g) forward edge mounting means for securing the forward edge of each flexible flap member between the laterally spaced chains at discrete attachment points on the flexible flap members, the forward edge mounting means having no rigid transverse members extending between the endless chains to thereby permit bending of the forward edge of the flap member between the discrete attachment points.

* * * * *